(12) United States Patent
Delalat

(10) Patent No.: US 8,090,364 B2
(45) Date of Patent: Jan. 3, 2012

(54) WIRELESS SECURITY SYSTEM

(75) Inventor: Hamid Delalat, Karlskrona (SE)

(73) Assignee: Yellow Arrow Trading L.L.C, Deira Dubai (AE)

( * ) Notice: Subject to any disclaimer, the term of this patent is extended or adjusted under 35 U.S.C. 154(b) by 1396 days.

(21) Appl. No.: 10/544,357

(22) PCT Filed: Feb. 3, 2004

(86) PCT No.: PCT/SE2004/000146
§ 371 (c)(1),
(2), (4) Date: Oct. 13, 2005

(87) PCT Pub. No.: WO2004/070591
PCT Pub. Date: Aug. 19, 2004

(65) Prior Publication Data
US 2006/0128305 A1    Jun. 15, 2006

(30) Foreign Application Priority Data
Feb. 3, 2003  (SE) ..................................... 0300252

(51) Int. Cl.
*H04B 7/00*    (2006.01)
(52) U.S. Cl. ........ 455/420; 455/445; 455/458; 455/41.2; 455/41.3; 455/411; 455/415; 455/435.1; 455/558; 455/410
(58) Field of Classification Search ............... 455/411, 455/41.2, 435.1, 41.1, 445, 458
See application file for complete search history.

(56) References Cited

U.S. PATENT DOCUMENTS

| | | | |
|---|---|---|---|
| 5,131,038 A * | 7/1992 | Puhl et al. ..................... | 340/5.61 |
| 6,088,450 A * | 7/2000 | Davis et al. .................... | 713/182 |
| 6,307,471 B1 | 10/2001 | Xydis | |
| 7,009,956 B2 * | 3/2006 | Heinonen et al. .............. | 370/338 |
| 7,302,571 B2 * | 11/2007 | Noble et al. ................... | 713/172 |
| 2003/0005300 A1 | 1/2003 | Noble et al. | |
| 2003/0007662 A1* | 1/2003 | Kaars ............................ | 382/100 |
| 2003/0008647 A1* | 1/2003 | Takatori et al. ................ | 455/420 |
| 2005/0014467 A1* | 1/2005 | Ishiwata et al. ................. | 455/39 |

FOREIGN PATENT DOCUMENTS

| EP | 1 182 843 A2 | 2/2002 |
|---|---|---|
| EP | 1 253 500 A1 | 10/2002 |

OTHER PUBLICATIONS

International Search Report of PCT/SE2004/000146, mailed Apr. 28, 2004.

* cited by examiner

*Primary Examiner* — Charles Appiah
*Assistant Examiner* — Randy Peaches
(74) *Attorney, Agent, or Firm* — Potomac Patent Group PLLC

(57) ABSTRACT

A wireless security or managing system based on Bluetooth technology suited for a person on the move prohibits the use, without proper authentication, of electronic devices having special software installed. A watch, key holder or mobile telephone or other mobile electronic device equipped with a Bluetooth unit serves as a master in the everyday environment of a user, enabling access to slave devices such as laptop and desk computers, palm computers and PDAs and mobile telephones. Unless the ~presence of the master device in the vicinity of a slave device is verified, the slave device automatically locks itself, switches itself or some import function off or enters a login state.

18 Claims, 7 Drawing Sheets

Fig. 1
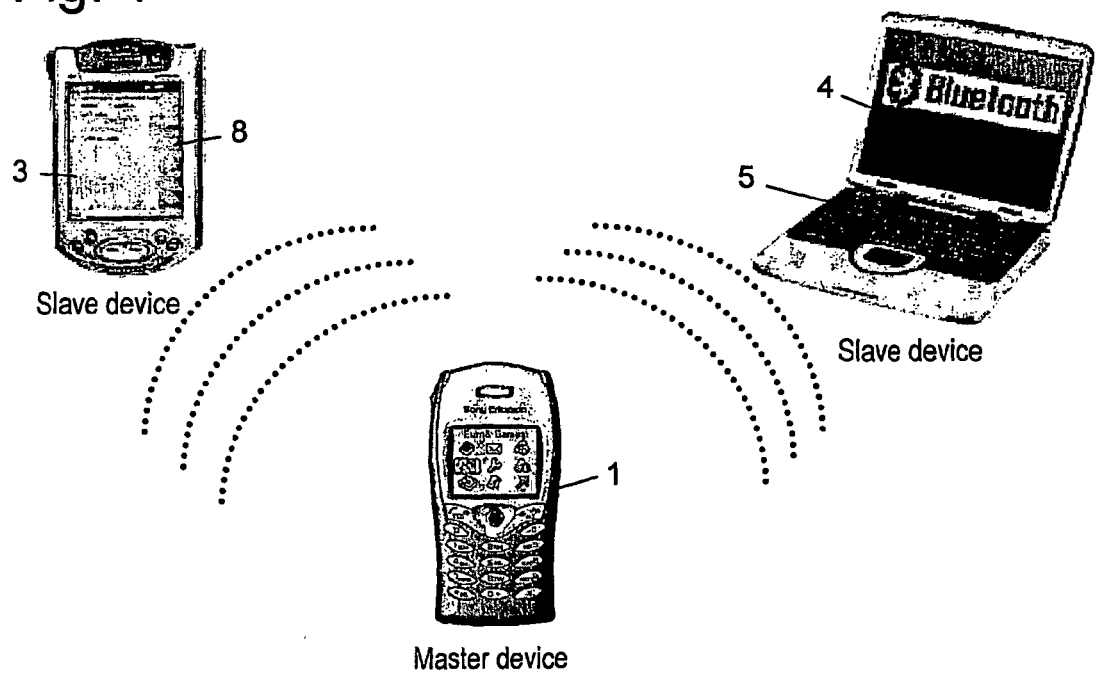
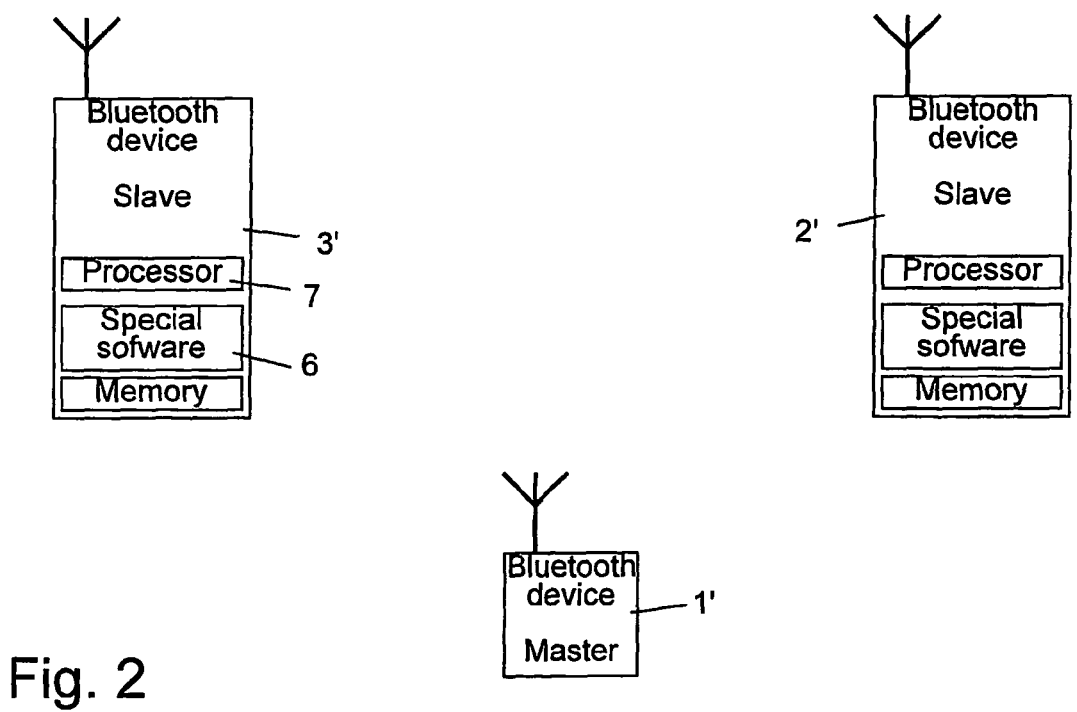
Fig. 2

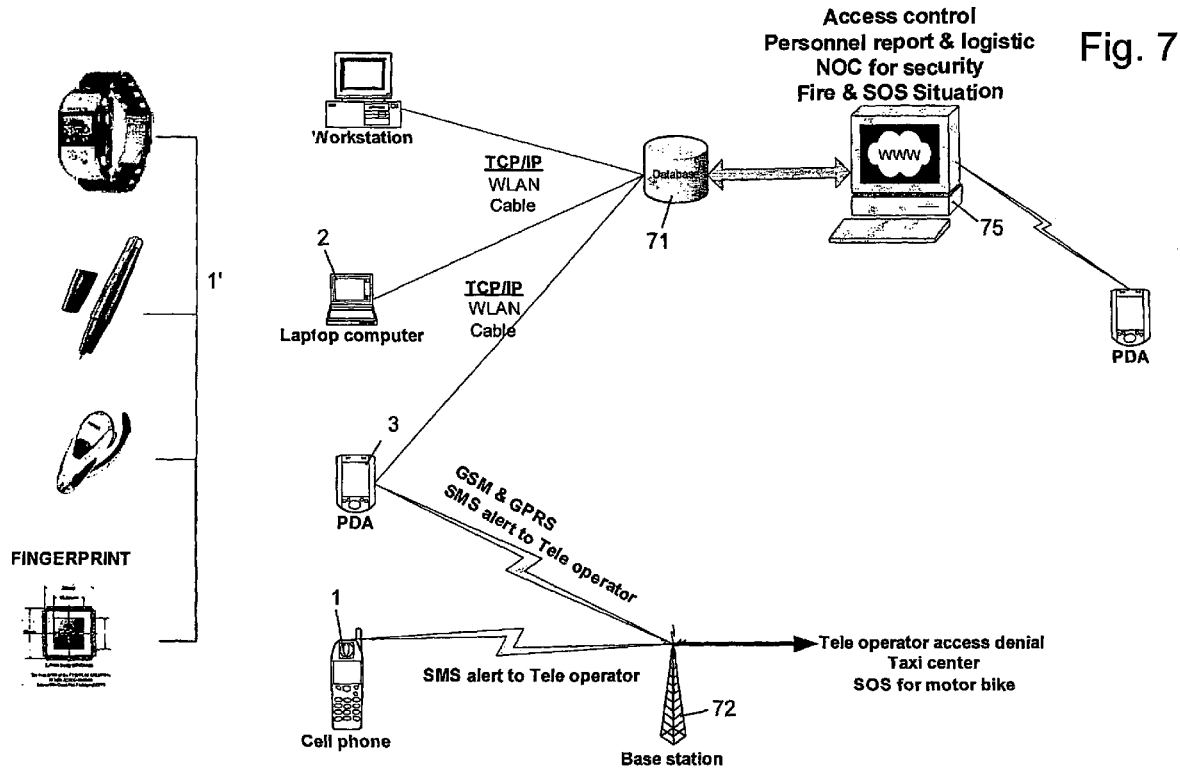

WIRELESS SECURITY SYSTEM

RELATED APPLICATION

This application claims priority and benefit from Swedish patent application No. 0300252-4, filed Feb. 3, 2003, the entire teachings of which are incorporated herein by reference.

TECHNICAL FIELD

The present invention is related to a wireless security or managing system based on short range radio communication such as Bluetooth technology.

BACKGROUND

An increasing number of electronic devices such as mobile telephones, PDAs etc. call for better systems to keep them from being stolen and the information kept therein from being misused. Thus, there is a need for a security system that can prohibit use of such personal electronic devices without a proper authentication.

Bluetooth Technology

The Bluetooth (BT) standard protocol or simply Bluetooth, as defined by the Bluetooth Special Interest Group, is an open standard for peer-to-peer communication and is based on short-range radio transmission in a globally available frequency band providing fast, reliable and secure communication. Providing devices with communication circuits and associated software according to Bluetooth eliminates the need for cables between electronic devices such as PCs, mobile telephones, handheld computers etc.

Bluetooth provides "ad hoc" networking, i.e. Bluetooth devices or units that are within communication distance can spontaneously exchange information with each other. A Bluetooth device or unit is herein taken to mean a device or unit including communication circuits and associated software working according to the Bluetooth specification. Bluetooth units can spontaneously establish small networks, piconets, including up to eight units. One of the units is assigned the role of "master" of the piconet and the others are "slaves". The slaves communicate with each other via the master. Communication can be established between Bluetooth units that belong to different piconets, e.g. through so called "scatternets", ad hoc peer-to-peer communication between overlapping piconets.

Mechanisms included a Bluetooth device ensure a high level of security:

A unique device address is assigned to each Bluetooth unit, which is entered in the chip in the manufacturing process.

Authentication prevents access to critical data and makes it impossible to falsify the origin of a message.

128-bit encryption prevents eavesdropping and maintains link privacy.

There are three different types of Bluetooth devices depending on how much transmission power they use:

A class 3 device has a 1 mW transmission power and a range of 0.1-10 meters.

A class 2 device has a transmission power of 1-2.5 mW and a range of 10 meters.

A class 1 device has a transmission power up to 100 mW and a range up to 100 meters.

The Bluetooth architecture, i.e. the circuitry and software required, includes a radio part, a base frequency part and a Link Manager. Bluetooth devices use a radio range at 2.45 GHz and the theoretical maximum bandwidth is 1 Mb/s. The Link Manager is an essential part of the Bluetooth architecture and is responsible for configuration, authentication and handling connections between BT devices.

In every Bluetooth device, the security is maintained by four entities at the link level:

The Bluetooth device address (BD_ADDR), which is a 48-bit address that is unique for each Bluetooth device and is defined by the Institute of Electrical and Electronics Engineers (IEEE).

The Private authentication key, which is a 128-bit number normally derived during the initialization process.

The Private encryption key, having a length of 8-128 bits and derived from the authentication process.

The random number (RAND), which is a frequently changing 128-bit random or pseudo-random number that is produced by the Bluetooth device itself.

The Bluetooth Generic Access Profile has three separate security modes:

Security Mode 1: non-secure
Security Mode 2: service level enforced security
Security Mode 3: link level enforced security The difference between Security Mode 2 and Security Mode 3 is that a Bluetooth device in Security Mode 3 initiates security procedures before a communication channel is established.

The Bluetooth standard also defines different security levels for devices and services. For devices, there are two levels: "trusted device" and "not trusted device", where a trusted device has unrestricted access to all services. For services, three security levels are defined: services that require authorization and authentication, services that require authentication only and services that are open to all devices.

A link key is defined as a 128-bit random number. It is shared between two or more parties and is the base for all security transactions. The link key is used in the authentication routine and as one of the parameters in deriving the encryption key. In order to accommodate for different types of applications, four types of link keys have been defined:

The combination key, KAB
The unit key, KA
The temporary key, Kmaster
The initialization key, Kinit The unit key is generated in a single device when it is installed. The combination key is derived from information from two devices and it is generated for each new pair of Bluetooth devices. The master key is a temporary key, which replaces the current link key. It can be used when the master unit wants to transmit information to more than one recipient. The initialization key is used as link key during the initialization process when there are not yet any unit or combination keys. It is used only during the installation.

The length of the Personal Identification Number (PIN) code used in Bluetooth devices can vary between 1 and 16 octets. The PIN code of one device can be fixed, forcing the connecting device to supply the appropriate PIN code. Another possibility is that the PIN code must be entered to both devices during the initialization.

The initialization key is required when two devices with no prior engagements need to communicate. During the initialization process, the PIN code is entered into both devices. The initialization key itself is generated by the E22 algorithm, which uses the PIN code, the Bluetooth Device Address of the device claiming the initializing process and a 128-bit random number generated by the verifier device as inputs. The resulting 128-bit initialization key is used for key exchange during the generation of a link key. After the key exchange the initialization key is discarded.

An important property of any ad hoc network such as a network working according to the Bluetooth specification is the neighbor discovery feature. The neighbor discovery procedure according to Bluetooth includes the Inquiry message and the Inquiry Response message. An "inquiry" procedure is defined which is used in applications where the device address of the destination is unknown to the source. A Bluetooth compatible unit wanting to discover neighboring Bluetooth units repeatedly transmits Inquiry messages and listens for Inquiry Response messages. An Inquiry message consists of an Inquiry Access Code (IAC). It does not contain any information about the source but may indicate the class of devices which should respond.

A Bluetooth unit receiving an Inquiry message, including a GIAC or an appropriate DIAC, may respond by sending an Inquiry Response message. The Inquiry Response message is actually an Frequency Hop Synchronization (FHS) packet. The FHS packet is a special control packet revealing, among other things, the transmitting unit and the clock of the transmitting unit. The payload field in such a packet includes eleven fields. All fields in the packet, except an AM_ADDR field and an "Undefined" field, indicate properties or parameters of the unit that sends the FHS packet. The three fields Lower Address Part (LAP), Upper Address Part (UAP) and Non-significant Address Part (NAP) fields together contain the BD_ADDR of the transmitting device. By listening for Inquiry Response messages the unit that initiated the Inquiry procedure can collect the BD_ADDR and internal clock values of the neighboring Bluetooth units.

An FHS packet is also used for other purposes according to the Bluetooth specification, in addition to the use as the Inquiry Response message, e.g. for a paged master response.

Related to the Inquiry procedure is the Page procedure, which is used to establish an actual connection between two BT units. Once the BD_ADDR of a neighboring unit is known to a unit, the paging unit, as a result of an Inquiry procedure, the neighboring unit can be paged by sending a Page message. Also the knowledge of the internal clock value of the unit to be paged will potentially speed up the Page procedure, since it makes it possible for the paging unit to estimate when and on which frequency hop channel the neighboring unit will listen for Page messages.

A Page message consists of the Device Access Code (DAC), derived from the BD_ADDR of the paged unit. A unit adapted to communicate according to the Bluetooth specification and receiving a Page message including its own DAC responds by sending an identical packet, i.e. including only the DAC of the paged unit. The paging unit then replies by sending an FHS packet, including the BD_ADDR of the paging unit, the current value of the internal clock of the paging unit, the AM_ADDR assigned to the paged unit and some other parameters. The paged unit then responds once again by transmitting its DAC and thereby the connection between the two units is established.

If the paging unit already was the master of a piconet, the paged unit has now joined this piconet as a new slave unit. Otherwise, the two units have just formed a new piconet having the paging unit as the master unit. Since the Inquiry message does not include any information on the sender thereof, in particular not its BD_ADDR, the unit that initiated the INQUIRY procedure is the only unit that can initiate a subsequent Page procedure. Thus, the unit initiating an Inquiry procedure will also be the master of any new piconet that is formed as a result of a subsequent Page procedure.

Thus, in setting up a Bluetooth link between two units, the BD_ADDR of each of the two participating units is transmitted to the other one.

SUMMARY

It is an objection of the present application to provide a flexible security solution for a "person on the move".

Generally, a wireless security system, network or installation based on Bluetooth technology is provided, suited for a "person on the move". The wireless security system prohibits the use, without proper authentication, of all personal electronic devices having special software installed.

A watch, key holder or mobile telephone or other mobile electronic device equipped with a Bluetooth unit can serve as the master in the everyday environment of a user, enabling access to slaves such as computers, mobile telephones or other devices secured by having special software running or activated therein. Unless the presence of the master of the system is verified, these slaves will automatically lock themselves, switch themselves or some import function off or enter a login state.

Generally thus, a lock function is provided, arranged to lock electronic devices such as PCs, PDAs or mobile telephones, the devices having facilities for executing a special application program, this application program and the execution thereof called a security or managing unit. The lock function lock works depending on the profile to which the Bluetooth slave devices belong. For example, a PC belongs to a pc-profile which means that as soon as the master does not respond to a slave request from the PC, the PC will activate the login function of its operative system or lock the PC or lock some important function.

A PIN code can be added to the system if a higher degree of security is required. The PIN code will authenticate the user so that, if the master device is lost, such as being lost to an unauthorized person, the user can still access the information in the personal computer.

The lock function can be activated or function in an operative system working as or integrated in some routine of the operative system such as a backup program, a disk cleanup program or a disk defragmenter program.

On the other hand the lock function can, if desired, activate other programs such as an antivirus program to scan the slave device for virus detection, an Internet security function to stop Internet traffic or a backup program to do backup on computer.

However, the operative system can have a plurality of locking functions. A mobile telephone can have lock functions including a SIM code lock, a telephone lock, an auto keylock and blocking the telephone book. The lock function of the special software can use the SIM code lock and run it as a telephone lock which in the case of a lost mobile telephone any unauthorized person does not know.

According to the mobile profile to which a mobile telephone belongs, the lock function will lock the mobile telephone and at the same time send its telephone book by SMS or in an E-mail or similar function to the owner of the mobile telephone or the telephone network operator (or service provider). Since the SMS contains the IMEI number, the operator or service provider can stop the service in those cases where the mobile telephone has been lost or stolen. Another function can be to send an SMS alert message when the mobile telephone has lost its connection with the master which can be any Bluetooth device, in addition to those mentioned above for example a Bluetooth head set.

The special software required for a personal computer is a piece of software running under some operative system, such as a version of Microsoft Windows, which "guards" the PC to protect it from the illegal intrusion. The special software looks for a master device such as a mobile telephone having a predetermined name periodically via the Bluetooth Inquiry scheme to be aware of the presence of a particular mobile telephone. If the master device is not found, the software locks the computer or exits some other programs running therein, such as the operative system except the login function thereof. The computer is unlocked only after the master device telephone has been rediscovered or the user of the computer has entered a valid password and possibly also, associated therewith, a valid user name, for starting the operative system. It is also possible to have a similar program executed in the BIOS of a computer which can even more enhance the security.

Specifically, the special software for a personal computer can "guard" the PC to protect it from illegal intrusion via TCP/IP. The special software periodically looks for a specific Bluetooth unit such as a specific mobile telephone having a predetermined name via the Bluetooth Inquiry scheme to be aware of the presence of the mobile unit acting as the master of the PC. If the master device is not found, the software can disconnect any currently established TCP/IP connection for the PC and abandon or stop any TCP/IP connection request. The TCP/IP connection will be allowed only after the mobile telephone has been re-discovered or the user of the computer has entered a valid password.

For devices such as mobile telephones which use an operative system such as the Symbian OS, or for example "Linux or Palm OS or Handspring", the special software is a piece of software running under the operative system (OS), which "guards" the mobile telephone to protect it from being illegally used. The special software looks for a master device having a predetermined name regularly via the Bluetooth Inquiry scheme to be aware of the presence of the master device having the predetermined name. If the master is not found, the special software locks or disables some important function or functions of the device. The device is unlocked after the master unit having the predetermined name has been re-discovered or the user of the device has entered a valid password.

Specifically, the special software running under the Symbian OS in device such as a mobile telephone, can, in the case where the master device having the predetermined name is or has not been found, the special software of the device can lock the telephone book of the device. The telephone book is unlocked only after the master having the predetermined name has been re-discovered or the user of the device has entered a valid password.

The system can thus be used as a PC authorization application and include added safety features such as port blocking and power management. It can be used in everyday electrical appliances such as TVs, VCRs, kitchen devices etc. In this field the most common need of control is whether the device should operate or not. Each device would have to recognize one or more masters in order to function, thereby preventing theft or misuse or that the device is left without being switched, such as is particularly important for stoves, irons etc. It can also be used to protect private homes. A standard home security system can automatically allow only authorized persons to enter the house or trigger an alarm if security is compromised. It can be used to protect mobile vehicles such as motor cars. Combined with a traditional car security system the system can allow features like "keyless vehicle" and "personal settings".

The master device of the system should advantageously have a low weight and be portable but is should also be durable and have a long lifetime. Since the security of several systems depends on the master it could be fitted with an internal advanced internal security guard, such as including a retinal or fingerprint scanner to ensure that the correct person is in command or possession of the master device.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 1 is a picture of a system securing the access of two slave devices,

FIG. 2 is a schematic of a system including two slave devices and one master device, FIG. 7 is a picture of a system allowing both securing of access to electronic devices and person management.

DETAILED DESCRIPTION

Figure 3:
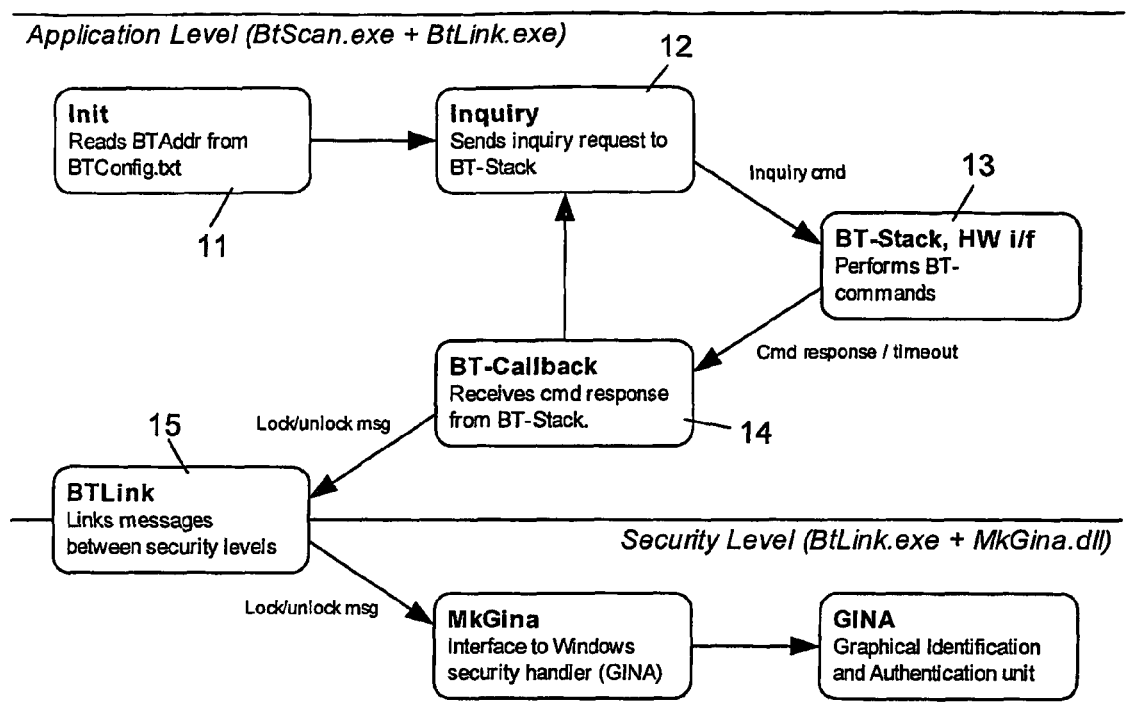
FIG. 3 is a block diagram of program modules of a security application in a PC.

A system will now described as an example for securing the access to various electronic devices. The example system comprises three separate devices, each having a Bluetooth interface, see FIG. 1, but in the most general case only two devices are required, one acting as master and preferably being mobile or portable and another acting as slave. In FIG. 1 a standard mobile telephone 1, equipped with Bluetooth standard software and circuits, serves as a master and requires no additional, special software. There are two slaves, a personal computer (PC) 2 such as a laptop computer and a PDA (Personal Digital Assistant) 3, each provided with Bluetooth standard software and circuits and in addition also special software. In this system the master device has to be within radio reach of a slave in order for the slave device to work or at least to perform important functions.

A general system is illustrated in FIG. 2 comprising a master device 1' and two slave devices 2' and 3'. All devices are provided with Bluetooth communication circuits but only in the slave units a special application program 6 is executed by the processors 7 of these units. The master device can thus be any Bluetooth device, preferably a portable device such as a mobile telephone according to FIG. 1, a key holder or intelligent wrist-watch, etc, or a unit specially adapted for the system, such a specialized unit only holding the Bluetooth circuits and some power supply. Either one or both of the slave and master devices between which the slave-master relationship has been established can have Bluetooth circuits adapted for communication only over a distance that can be sufficiently small, adapted to the use of the slave device. Thus, preferably the Bluetooth circuits of the master device can be designed, such as in specialized master device, to have a communication of only a maximum of e.g. 5 m. The master device can e.g. be a Bluetooth class 3 device or possibly a Bluetooth class 2 device.

Thus, with reference to FIG. 1, a small background application program run in the PC 2 can e.g. switch between internal states of an operative system such as Microsoft Windows, these internal states typically including locked and unlocked states, depending on the presence of the master device that has to be located in the vicinity of or sufficiently close to the PC, in particular within radio reach of the BT circuits of the PC. A similar application program in the PDA 3 can e.g. deactivate/activate the display of the PDA, thus securing input to and output from the PDA.

The PC 2 includes a display 4 and a keyboard 5 and in an example system the PC 2 requires one PCMCIA slot and uses as operative system Microsoft Windows 2000 or Windows XP. In the PCMCIA slot a BT Card for PCMCIA is connected. The PDA 3 is a Compaq Ipaq including an integrated BT module and running Windows Pocket PC as operative system. The mobile telephone 1 is any mobile telephone including an integrated BT module.

In the system the special software or special application program run in each of the BT slave units 2', 3' (2, 3) has to be adapted to other software or applications run in the respective slave unit, in particular to the operative system run therein. The master unit 1' (1) can generally be any Bluetooth unit. The special application programs 6 which will be described below should only be considered as simple examples of the way in which Bluetooth can be used for transmitting un unlock key. The special application programs continuously scan, at predetermined time intervals, for the predetermined master device 1'. Using this method it can, in a worst case, take up to e.g. ten seconds before the BT slaves 2', 3' detect the presence or absence of the predetermined master device.

The application program for a PC 2 can control the standard lock and unlock functionality of the operative system run in the PC, such as Microsoft Windows. When the mobile or handheld Bluetooth device 1 (1') acting as the master of the system comes in range of the BT radio communication circuits of the PC, the PC 2 will e.g. unlock itself, unlocking all functions of the operative system, and when it gets out of range the PC will in this example get locked, i.e. strictly unlocking all function except the logging-in facility of the operative system. Before the PC will be locked, a message can be shown for e.g. 10 seconds on the display 4 of the PC. This is done to give the user of the personal computer a chance to abort the locking action that will otherwise be executed as will be described hereinafter.

When the special application program is running in the PC 2, a lock symbol can be shown in the system tray, located at the side of the clock on the task bar, as shown on the display 4, at the lower edge thereof, when running Microsoft Windows. When the application is active the lock symbol is blue and otherwise it is gray. In order to switch between active and inactive state of the special application a user can double-click on the lock symbol. E.g. the special application program can be terminated, i.e. transferred to an inactive state, by right-clicking on the lock symbol and then choosing an alternative "Exit application". In the inactive state the PC 2 will not be protected by the special application program.

The PC application program can in Microsoft Windows 2000 use the Windows standard Security Manager (SM) to lock and unlock the personal computer. The SM is protected from the normal application area for security reasons. In order to bypass this protection three different applications are run on different access levels to pipe messages from the application level to the SM. These applications are MkGina.dll, BtLink.exe and BtScan.exe, see FIG. 3:

MkGina.dll—Installed inside the SM. Performs the actual lock and unlock tasks.

BtLink.exe—Installed as a WinNT Service. Its purpose is to link calls between the BtScan.exe module and MkGina.dll.

BtScan.exe—Senses the handheld Bluetooth device acting as master device and determines if the computer should be locked or unlocked. Sends messages to the MkGina through the BtLink.

The Bluetooth address of the master of the system can be configured in a file called BTConfig.txt.

In the diagram of FIG. 3 the main program steps or program modules executed periodically or repeatedly, at predetermined time intervals, by the special application program for the PC 2 are illustrated. In a first initial step 11 the BT circuits are initiated or activated and the BT_ADDR of the master device is read from the configuration file BTConfig.txt. In a next program module 12, called Inquiry, a command for an Inquiry Request is sent to a program module 13 called BT-stack containing an API to the BT stack and circuits. In the module 13 the API commands the BT circuits to perform the command Inquiry Request to find all BT units located within reach. The API sends, after a predetermined time period, a command response, holding identifications of detected BT units to the file BtScan.exe which in a step 14 executes a state machine BT-Callback holding the current lock/unlock status of the PC. The state machine receives the command response and determines whether one of the identifications, i.e. BT_ADDR, of other BT devices found matches that read from BTConfig.txt. In the cases where the outcome of the comparison indicates that no matching identification was found and that the PC is a locked state or that a matching identification was found and that the PC is an unlocked state, a signal is sent to the step 12 for issuing a new command for an Inquiry Request. In the other cases, i.e. when no matching identification was found and the PC is an unlocked state or a matching identification was found and the PC is a locked state, a message signalling this, a lock/unlock message, is sent to the linking file BtLink.exe which in step 15 sends a message having the same information to the program MkGina.dll that in step 16 forms an interface to Windows security handler, and GINA, the Graphical Identification and Authentication unit. The latter receives the information whether the computer should be locked/unlocked in a step 16 and executes steps, not illustrated, to execute the respective locking or unlocking action. The program modules 11-14 can be included in the file BtScan.exe.

A special application program for a PDA 3 such as a Compaq iPaq H3970 uses a simulated locking/unlocking procedure. When the PDA is locked, a full-screen message is shown on the display 8. This is not in any way to be considered as a "real" lock. The PDA application scans continuously for the master unit 1. When the master unit 1 is outside scan range a fill screen message such as "Bluetooth Lock" is shown on the display of the PDA. The application program can be downloaded using Microsoft Active Sync. A dll-file SdkCE.dll is needed on the PDA.

Figure 4:
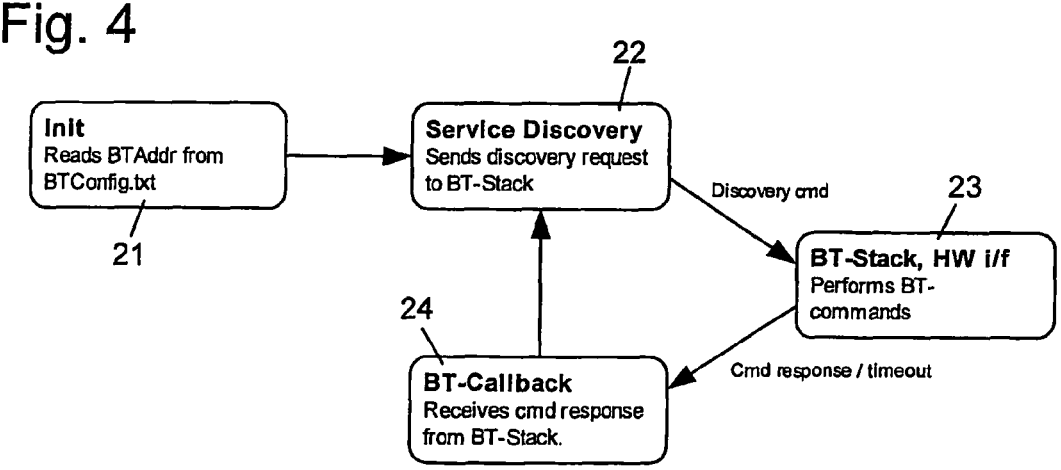
FIG. 4 is a block diagram of program modules of a security application in a PDA.

In the diagram of FIG. 4, the main program steps or modules executed repeatedly, at predetermined time intervals, by the special application program for a PDA 3 are illustrated. In a first initial step 21 the BT circuits of PDA are activated and the BT_ADDR of the master device 1 is read from the configuration file BTConfig.txt. In a next program step 22, called Service Discovery, a command for an Inquiry Request or Discovery command is sent to a program module BT-stack containing an API to the BT stack and circuits. Then, in step 23 the BT-stack commands the BT circuits to perform the command Inquiry Request to find all BT units located within reach. The API sends, after a predetermined time period, a command response, holding identifications of detected BT units to a program module 24, called BT-Callback, which is a state machine holding the current lock/unlock status of the PDA. The state machine receives the command response and determines whether one of the identifications, i.e. BT_ADDR, of other BT devices found matches that read from BTConfig.txt. In the cases where the outcome of the comparison indicates that no matching identification was found and that the PDA is in a locked state or that a matching identification was found and that the PDA is an unlocked state, a signal is sent to the program module 22 for issuing a new command for an Inquiry Request, preferably after some predetermined delay. In the other cases, i.e. when no matching identification was found and the PDA is an unlocked state or a matching identification was found and the PDA is a locked state, the appropriate action is taken, i.e. locking or unlocking the PDA, respectively.

For a palm computer such as Palm TUNGSTEN T2 the special application program can protect all important functions. As above, unless the presence of the master 1, 1' is verified, the use of such palm computers will automatically be locked or stopped.

Figure 6:
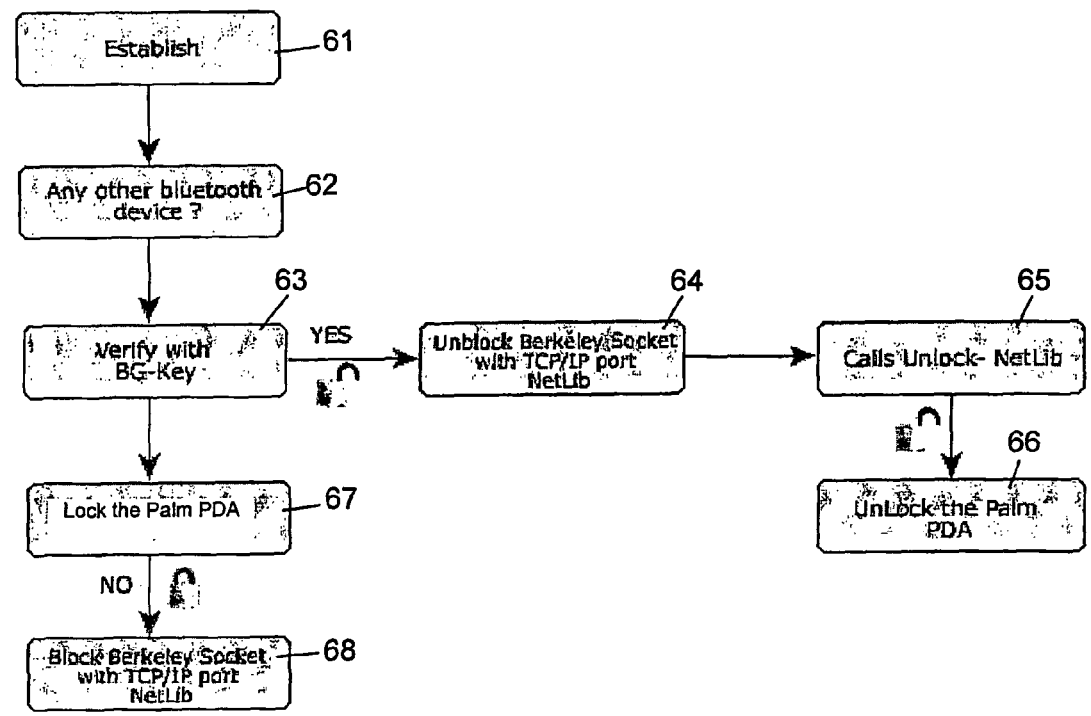
FIG. 6 is a simplified flow diagram of program steps executed by a security application program in a PDA.

In the flow diagram of FIG. 6, the main or general steps are illustrated which are executed by the special application program in a Bluetooth device acting as slave in the system including also steps performed when a password such as a PIN is used. In a start step 41 the special application program 6 is started and also the standard procedures for Bluetooth communication including the Inquiry procedure. In a step 42 it is asked whether the device is connected to any other BT device, using the Bluetooth Inquiry procedure. If it is not, a step 43 is executed in which there is a delay of N seconds and then the step 42 is repeated, i.e. after a delay of N seconds. However, if there is at least one Bluetooth device to which the considered slave device is connected, the BT device address/addresses of all connected Bluetooth devices are retrieved in step 44 and this address/these addresses is/are compared to the stored BT device address of the master device in step 45. If a matching address is found in step 45, a step 46 is executed in which it is asked whether the predetermined one of the computer, i.e. the considered device, a predetermined function of the device, the display of the device, a memory portion or cell or a list stored in the memory cell is locked or blocked. If it is not locked or blocked, no action has to be taken, i.e. the device can work as previously, and thus the delay step 43 is again executed. In the case where it is locked or blocked, a step 47 is executed in which the respective one of the considered device, a predetermined function of the device, the display of the device, a memory portion or cell or a list stored in the memory cell of the device is unlocked/unblocked or started. Then, the delay step 43 is executed. If it is found in step 45 that there is no matching BT device address, a step 48 is executed in which it is asked whether the respective one of the considered device, a predetermined function of the device, the display of the device, a memory portion or cell or a list stored in the memory cell of the device is currently locked/blocked or stopped. It this is true, the delay step 43 is again executed. Otherwise, in a step 49 the user of the considered device is asked to input a password such as PIN on the keyboard of the device. In the next step 50 it is asked whether a password has been entered and whether it is correct by comparing to a previously entered password. The correct password must be entered within a predetermined time period, within M seconds. If the correct password has been entered within the predetermined time, the device can continue to work in the same way as before and thus the delay step 43 is again executed. If a correct password has not been entered within the predetermined time, a step 51 is executed in which the respective one of the considered device, a predetermined function of the device, the display of the device, a memory portion or cell or a list stored in the memory cell of the device is locked/blocked or stopped. Then the delay step 43 is again executed.

Examples of locking actions can include:

preventing anyone from logging in to the operative system of the device in case where somebody has not already logged in.

in the case where somebody has already logged in to the operative system of the device, ending possible user programs that are running, including storing files being processed and then logging out of the operative system, i.e. stopping the part of the operative system in which user programs can be run. Alternatively, if there is such a function in the operative system, said part of the operative system can be halted or set to a pause state.

in the case where the device is a mobile telephone, the most important functions of the mobile telephone can stopped such as stopping all functions without those of receiving calls and the Bluetooth functions. All manual input to the mobile telephone can be stopped except pressing the "Yes" and "No" keys for accepting calls.

abandon a TCP/IP connection such as with the Internet for preventing hacking programs from accessing the device from the Internet.

locking the telephone book or list of a mobile telephone or similar device or the mailing list of a computer. This can be made by e.g. locking a predetermined memory area of the telephone or device.

As has been indicated above, an Internet connection can be interrupted in order to protect the computer such as a palm computer or PDA from being accessed from the Internet when the user has moved away from the computer. In the flow diagram of FIG. 6 this case is illustrated for a palm computer or PDA such as TUNGSTEN T2. The periodically repeated loop of the special application program starts in a step 61 after which it is asked in a step 62 whether there are other BT devices connected to the palm computer or PDA. If another BT device is found and it has the correct identification as checked in a step 63 and the device is in a locked state, in a step 64 a function of the program NetLib first enables or unblocks a Berkeley Socket port having a TCP/IP port and connects the device to the Internet. Then, in step 65 a function Unlock of the program NetLib is called which in turn in step 66 unlocks the palm computer or PDA. In the case where there were no other BT device having the correct identification according to step 63 and the device is in an unlocked state, the device is locked in a step 67 and the Berkeley Socket port is blocked by calling, in a step 68, a function of the program NetLib. A Berkeley Socket is a protocol used to share TCP/IP ports between palm computers and PDAs in Bluetooth networks, Wi-Fi LANs and HotSync with PCs.

Figure 8:
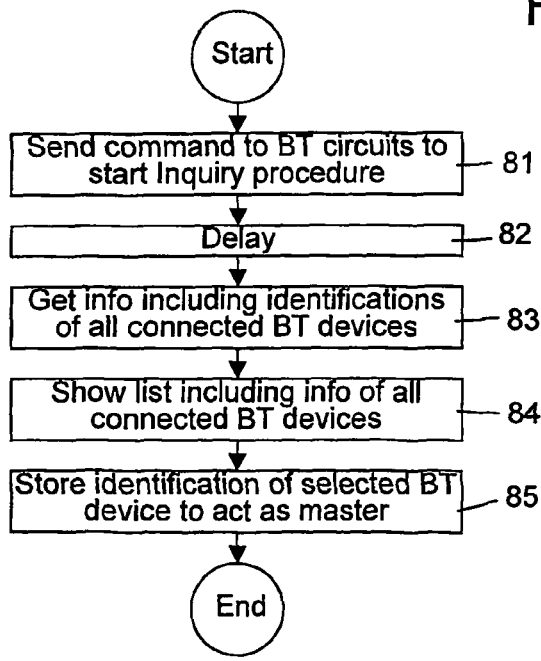
FIG. 8 is a flow diagram of steps for initializing the master device to a slave device.

The storing of the identification of the device that is to act as a master to another device that is to be a slave can be made very simply, as appears from the flow diagram of FIG. 8. The special application program in the slave device then in a first step 81 sends a command to the BT circuits to look for other BT units. After a delay illustrated by the step 82 the info of found BT devices is accessed in a step 83 and this info is then in step 84 shown as a list on the display of the device. The user selects the master device by highlighting or clicking on the respective line of the lists to select it. In the last step 85 the identification of the selected BT devices is stored.

Figure 9:
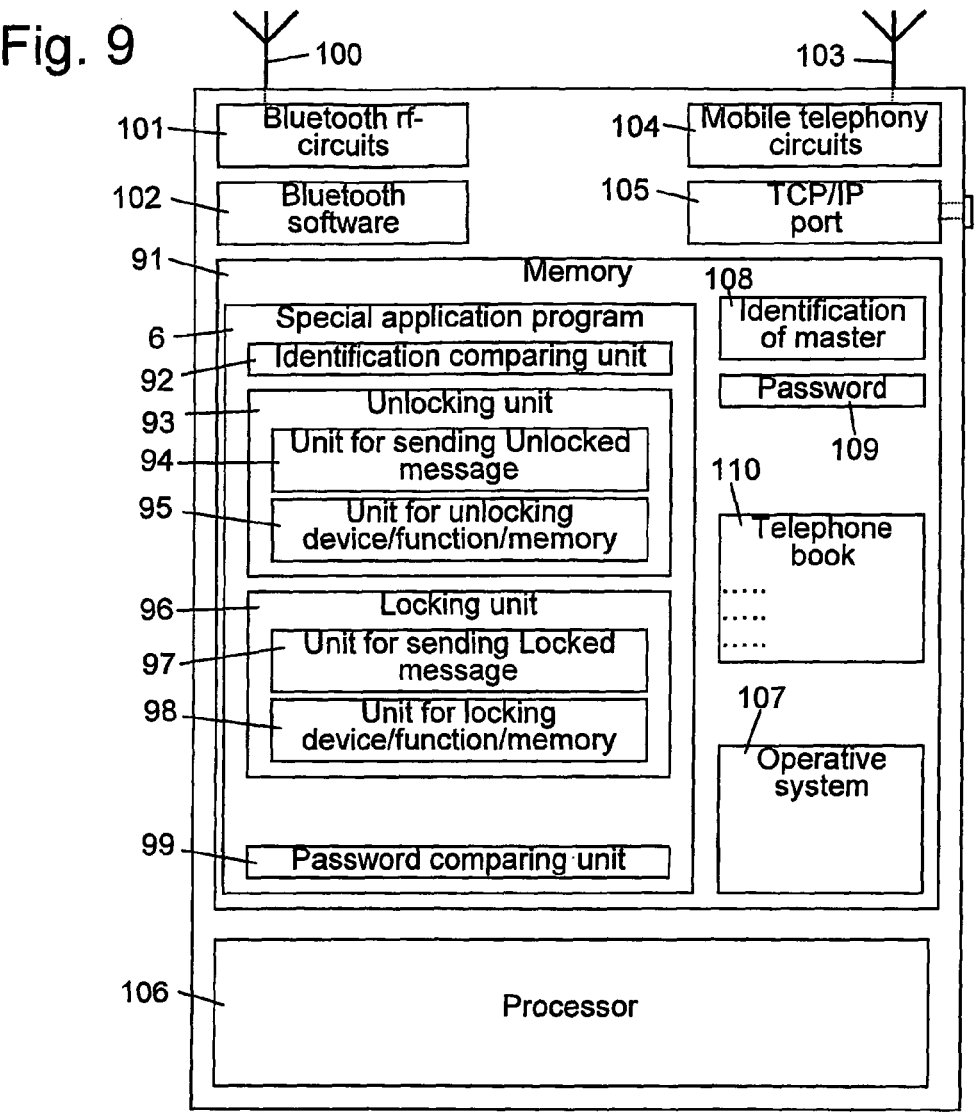
FIG. 9 is a schematic illustrating main components of a slave device.

The various main components that be included in a slave device appear from the schematic of FIG. 9. The special application program 6 is stored in a memory 91 and includes an identification comparing unit 92, an unlocking unit 93 comprising a subunit 94 for sending an Unlocked message and a subunit 95 for unlocking the device/function/memory, a locking unit 96 comprising a subunit 97 for sending a Locked message and a subunit 98 for locking the device/function/memory, and a password comparing unit 99. The components for Bluetooth communication include an antenna 100, Bluetooth rf-circuits 101 and Bluetooth software 102. Furthermore, components for wireless telephony communication can be provided such as an antenna 103 and mobile telephony circuits 104. A TCP/IP port 105 can also be provided and the device further includes a processor 106 executing programs according to an operative system 107 stored in the memory. In the memory 91 memory cells or memory areas 108, 109 and 110 are provided for storing the identification of the master of the considered device, a password and a telephone book, respectively.

Figure 5:
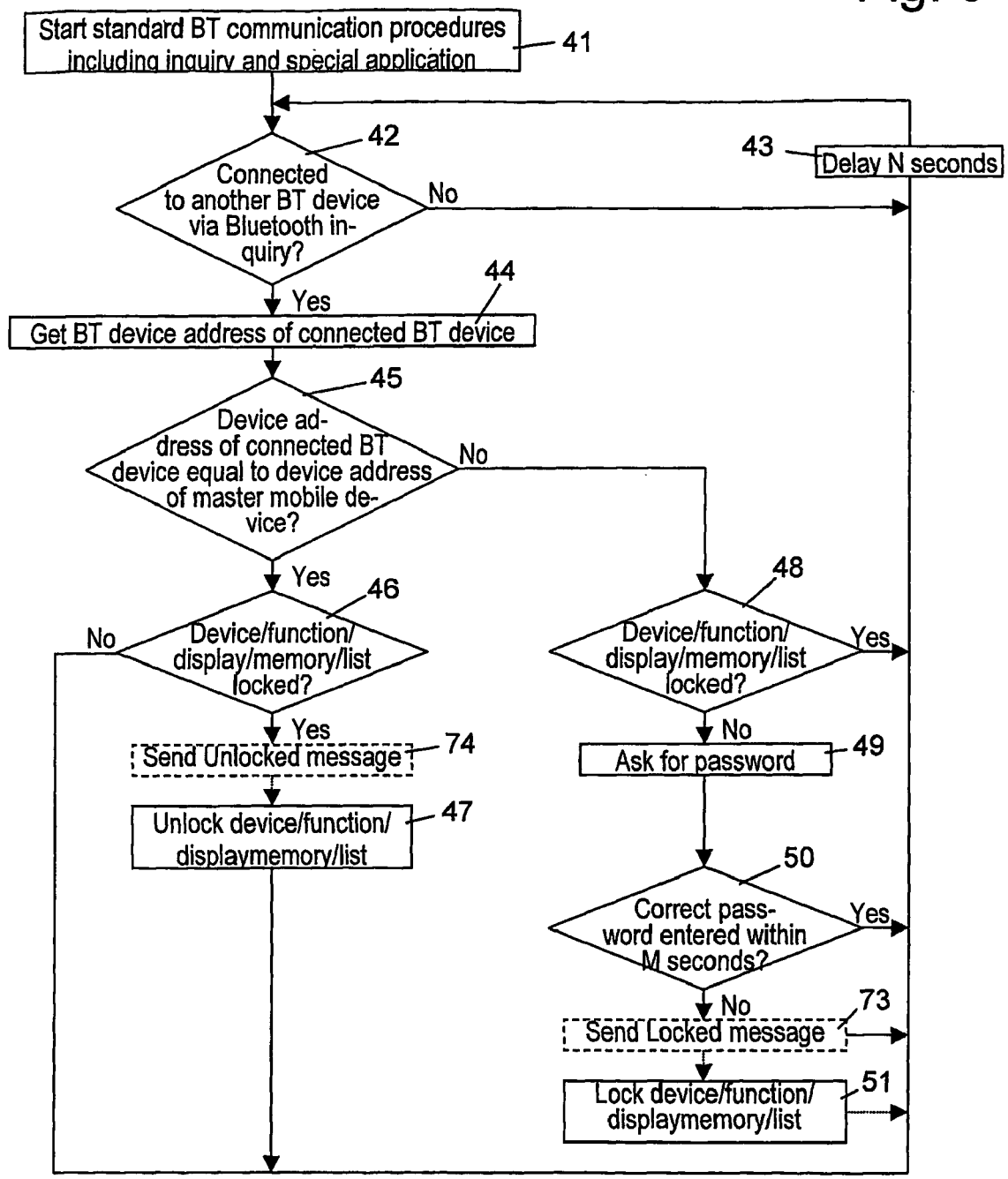
FIG. 5 is a flow diagram of program steps executed by a security application program.

The system described above can also be used for monitoring persons. Thus, in FIG. 7 a system is illustrated including above various devices such as PCs 2, palm computers or PDAs 3 and mobile telephones 1. Each of these devices is associated, as a slave in a slave-master relationship as described above using Bluetooth, with an individual master device 1' owned by a person. The PCs, palm computers and PDAs all communicate using TCP/IP connections via the Internet with a server 71 including a database. The PDAs and mobile telephones communicate, using mobile telephony, via a base station 72 with a service including a database of a telecommunication company. To the special application programs run in the slave devices two functions have been added: sending an Unlocked message when the device is becoming unlocked and sending an Locked message when the device is becoming locked, via the Internet to the server and as SMS-messages to the operator service, respectively. These functions are seen as steps 73 in the flow diagram of FIG. 5. Then, the messages are stored in the database of the server and telecommunication company and can be inspected using a computer, as seen at 75 in FIG. 7, to e.g. manage presence of persons at their office computers, and for issuing alarms in the cases where slave devices expected to be unlocked are found to be locked.

Figure 10:
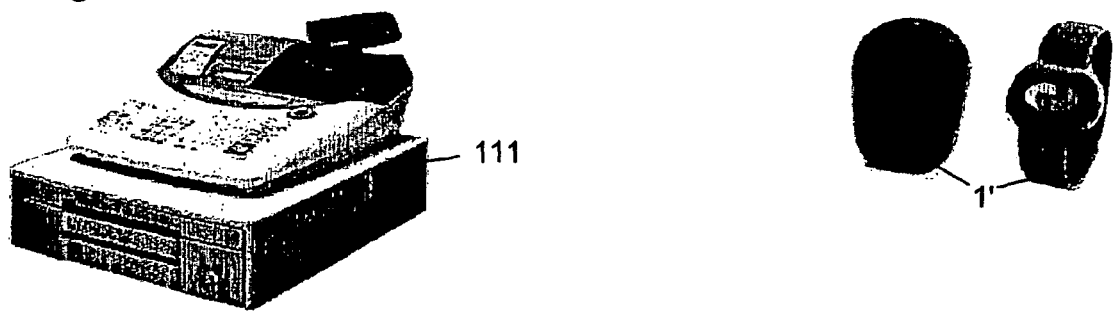
FIG. 10 is a picture of a system for securing access to a cash register.
Figure 11:
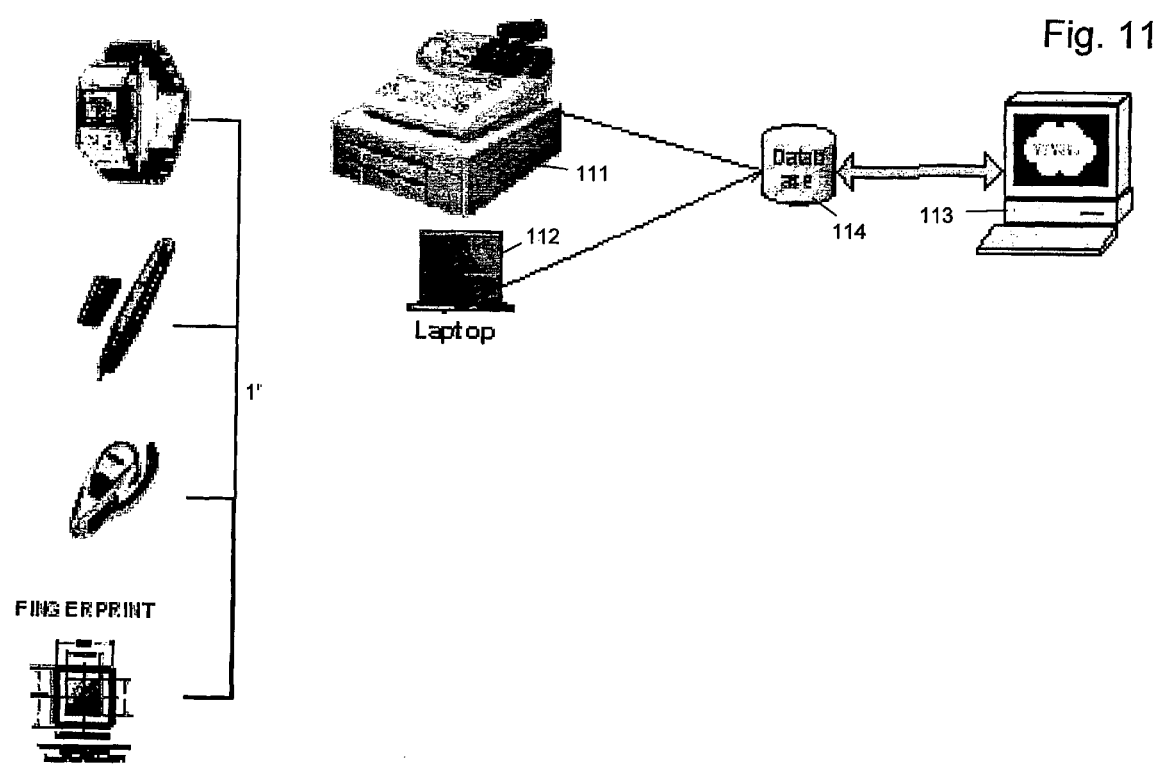
FIG. 11 is a picture of a system for securing and managing access to cash registers.

Another application includes that the slave device is a cash register 111, see FIG. 10. The master device 1' of the cash register then can replace or be complementary to the mechanical lock and its matching key of the cash register. When the authorized user is sufficiently close to the cash register, she/he can use the cash register, in particular open the drawer thereof containing the cash or money. In e.g. a shop where there may be a plurality of cash registers, the authorization of persons for the cash registers can be monitored by a computer such as laptop computer 112, see FIG. 11, having Bluetooth circuits. The laptop computer when moved in the vicinity of one of the cash registers can e.g. take away access from the cash register for the master device currently installed for the cash register. The cash registers 111 can also communicate in some way with a central server 113 containing a database 114 in which information of the cash registers are stored. The server can then be used to give access to and take away access from a cash register. The data base can as above be used for monitoring employed persons.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A wireless security method for a slave device having a short-range, ad hoc network capable wireless transceiver, the wireless security method comprising the steps of:
   actuating said slave device, said slave device having a master device address stored therein;
   automatically performing, by said slave device, an inquiry procedure to wirelessly connect to one or more devices within range of said slave device's short-range, ad hoc network capable, wireless transceiver;
   automatically obtaining, by said slave device, an address of each of said one or more devices;
   comparing, by said slave device, said one or more addresses obtained by said slave device to said stored, master device address to determine if there is a match such that said slave device is within range of said master device;
   if there is a match, then:
      if at least one function associated with said slave device is locked, then unlocking said at least one function;
      otherwise, if said at least one function is unlocked, continuing to enable said at least one function associated with said slave device;
   otherwise, if there is not a match, then:
      requesting, by said slave device, that a password be entered into a user interface of said slave device; and
      if a valid password is not entered within a predetermined time period, locking said at least one function associated with said slave device.

2. The wireless security method of claim 1, wherein said step of automatically performing said inquiry procedure is initiated by said slave device without first receiving a signal from said one or more devices.

3. The wireless security method of claim 1, wherein said locking of said at least one function includes at least one of:
   preventing a user from logging into an operating system of said slave device;
   ending a program running on said slave device;
   blocking receipt of signals by said slave device;
   closing a TCP/IP connection associated with said slave device; and
   locking a predetermined memory area associated with said slave device.

4. The wireless security method of claim 1, wherein said unlocking of said at least one function includes at least one of:
   enabling a user to log into an operating system of said slave device;
   enabling a program running on said slave device;

enabling receipt of signals by said slave device;
enabling a TCP/IP connection associated with said slave device; and
providing access to a predetermined memory area associated with said slave device.

5. The method of claim 1, wherein said short-range, ad hoc network capable wireless transceiver is a Bluetooth® transceiver.

6. The method of claim 1, further comprising the steps of repeatedly, at periodic intervals, performing the steps of automatically performing, automatically obtaining, comparing and selectively unlocking or locking said at least one function.

7. A wireless security system comprising:
a master mobile device including:
a wireless transceiver for transmitting and receiving short-range, wireless signals; and
a memory for storing an identifier associated with said mobile master device;
wherein said master mobile device transmits said identifier in response to a received inquiry signal;
a slave device including:
a wireless transceiver for transmitting and receiving short-range wireless signals;
a memory device for storing said identifier associated with said mobile master device;
wherein, when actuated, said slave device automatically broadcasts said inquiry signal to any short-range, ad hoc network capable, devices which are within range of its short-range wireless signals to obtain an identifier from each of said devices;
a processor for comparing said one or more identifiers obtained by said slave device to said stored, master device identifier to determine if there is a match such that said slave device is within range of said master device;
if there is a match, then:
if at least one function associated with said slave device is locked, then unlocking said at least one function;
otherwise, if said at least one function is unlocked, continuing to enable said at least one function associated with said slave device;
otherwise, if there is not a match, then:
requesting, by said slave device, that a password be entered into a user interface of said slave device; and
if a valid password is not entered within a predetermined time period, locking said at least one function associated with said slave device.

8. The wireless security system of claim 7, wherein automatic broadcast of said inquiry signal is initiated by said slave device without first receiving a signal from said master mobile device.

9. The wireless security system of claim 7, wherein said locking of said at least one function includes at least one of:
preventing a user from logging into an operating system of said slave device;
ending a program running on said slave device;
blocking receipt of signals by said slave device;
closing a TCP/IP connection associated with said slave device; and
locking a predetermined memory area associated with said slave device.

10. The wireless security system of claim 7, wherein said unlocking of said at least one function includes at least one of:
enabling a user to log into an operating system of said slave device;
enabling a program running on said slave device;
enabling receipt of signals by said slave device;
enabling a TCP/IP connection associated with said slave device; and
providing access to a predetermined memory area associated with said slave device.

11. The wireless security system of claim 7, wherein said wireless transceiver of said master mobile device and said slave device is a Bluetooth® transceiver.

12. The wireless security system of claim 7, wherein said processor repeatedly, at periodic intervals, performs the operations of automatically broadcasting, comparing and selectively unlocking or locking said at least one function.

13. A security-controlled slave device, which is at least partially locked when out of proximity of a mobile master device, said slave device comprising:
a wireless transceiver for transmitting and receiving short-range wireless signals;
a memory device for storing an identifier associated with said mobile master device;
wherein, when actuated, said slave device automatically broadcasts said inquiry signal to any short-range, ad hoc network capable, devices which are within range of its short-range wireless signals to obtain an identifier from each of said devices;
a processor for comparing said one or more identifiers obtained by said slave device to said stored, master device identifier to determine if there is a match such that said slave device is within range of said master device;
if there is a match, then:
if at least one function associated with said slave device is locked, then unlocking said at least one function;
otherwise, if said at least one function is unlocked, continuing to enable said at least one function associated with said slave device;
otherwise, if there is not a match, then:
requesting, by said slave device, that a password be entered into a user interface of said slave device; and
if a valid password is not entered within a predetermined time period, locking said at least one function associated with said slave device.

14. The security-controlled slave device of claim 13, wherein automatic broadcast of said inquiry signal is initiated by said slave device without first receiving a signal from said master mobile device.

15. The security-controlled slave device of claim 13, wherein said locking of said at least one function includes at least one of:
preventing a user from logging into an operating system of said slave device;
ending a program running on said slave device;
blocking receipt of signals by said slave device;
closing a TCP/IP connection associated with said slave device; and
locking a predetermined memory area associated with said slave device.

16. The security-controlled slave device of claim 13, wherein said unlocking of said at least one function includes at least one of:
enabling a user to log into an operating system of said slave device;
enabling a program running on said slave device;
enabling receipt of signals by said slave device;
enabling a TCP/IP connection associated with said slave device; and providing access to a predetermined memory area associated with said slave device.

17. The security-controlled slave device of claim 13, wherein said wireless transceiver of said slave device is a Bluetooth® transceiver.

18. The security-controlled slave device of claim 13, wherein said processor repeatedly, at periodic intervals, performs the operations of automatically broadcasting, comparing and selectively unlocking or locking said at least one function.

* * * * *